Jan. 17, 1967 R. A. HERMAN 3,299,409

DIGITAL APPARATUS

Filed Dec. 30, 1963 2 Sheets-Sheet 1

INVENTOR.
ROBERT A. HERMAN
BY Arthur Freilich
ATTORNEY

DIGITAL APPARATUS
Filed Dec. 30, 1963 2 Sheets-Sheet 2
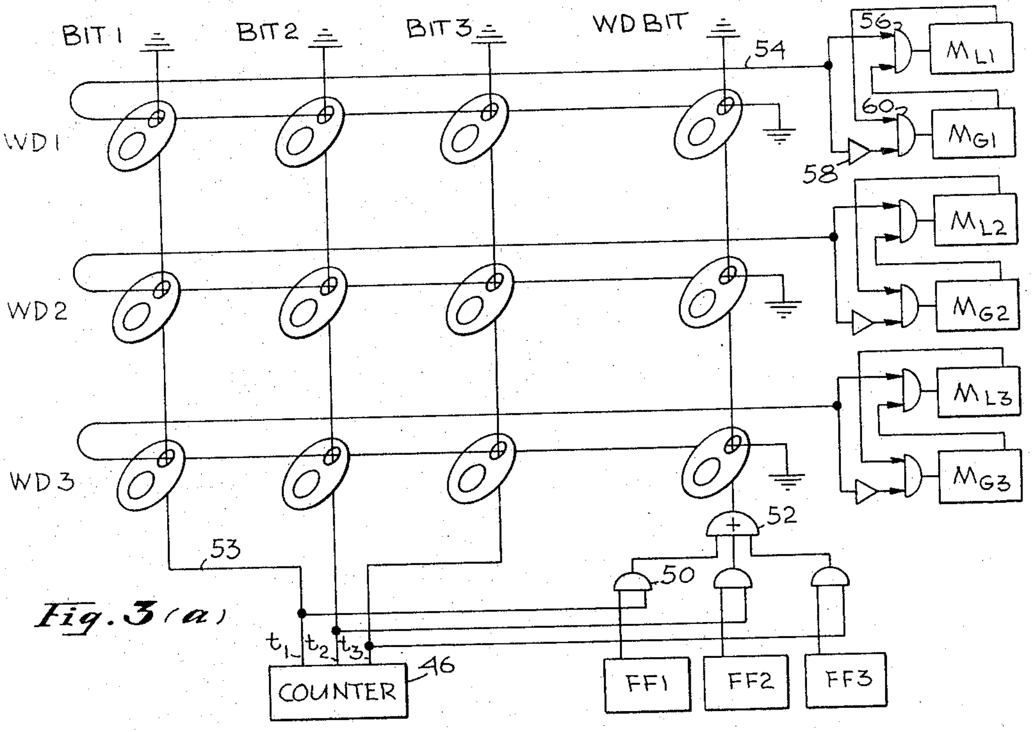
Fig. 3(a)
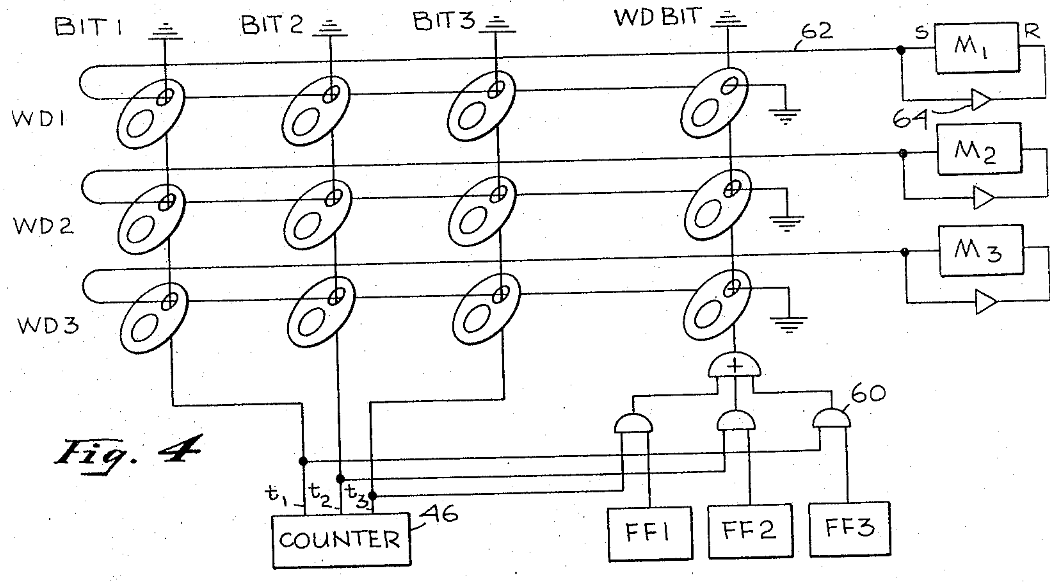
Fig. 4
| | TEST NUM. BIT | STORED BIT | S.C. OUT | W.C. OUT | RESULT |
|---|---|---|---|---|---|
| (1) | 0 | 0 | | | |
| (2) | 0 | 1 | + | | + |
| (3) | 1 | 0 | | − | − |
| (4) | 1 | 1 | + | − | |
Fig. 3(b)
INVENTOR.
ROBERT A. HERMAN
BY Arthur Freilich
ATTORNEY United States Patent Office 3,299,409
Patented Jan. 17, 1967

3,299,409

DIGITAL APPARATUS

Robert A. Herman, Los Angeles, Calif., assignor, by mesne assignment, to The Bunker-Ramo Corporation, Stamford, Conn., a corporation of Delaware Filed Dec. 30, 1963, Ser. No. 334,316
13 Claims. (Cl. 340—172.5)

This invention relates generally to digital apparatus and more particularly to apparatus for simultaneously comparing the magnitude of each of a set of digital numbers with the magnitude of a digital test number.

U.S. Patent No. 3,031,650 discloses some basic content addressable memory implementations and discusses the characteristics which distinguish such memories from conventional digital memories. Briefly, the significant distinguishing characteristic is that each memory location in a content addressable memory is not uniquely identified by an address as in conventional digital memories but instead content addressable memory locations are selected on the basis of information stored therein; i.e. the contents thereof. Hence the name content addressable memory.

As a result of selecting locations on the basis of stored information, memory search times can be considerably reduced at the cost of some additional hardware. That is, in situations where it is desired to select those locations, out of N locations in memory, storing information (words) which match a search or test word, information identifying those locations can be derived in one memory access period instead of the N such periods required by conventional digital memories. More particularly, whereas it is necessary in a conventional digital memory to sequentially access the contents of each location (a word) and compare each such word with the search word, comparison of the search word with all of the stored words can be simultaneously effected in a content addressable memory.

Essentially, the content addressable memory disclosed in the cited patent operates by causing a signal representative of a search word bit to be applied simultaneously to all memory location elements storing bits of corresponding significance. Some type of logic means is provided in the memory, such means being operable to generate signals to indicate whether the bits stored in the various memory location elements are the same as or different from the corresponding search bit being sought. All elements of a single memory location are coupled to a common word sense line and by sensing resultant signals appearing on the word sense line, a determination is made as to whether or not the word stored in the memory location associated with the word sense line matches or mismatches the search word.

The content addressable memory embodiments disclosed in the aforementioned U.S. Patent No. 3,031,650 provide for not only simultaneously comparing each stored word with a search word, but in addition for simultaneously considering all of the bits in the search and stored words. Whereas only comparisons for identity are specifically considered in the cited patent, the invention herein is embodied in apparatus directed to the performance of magnitude comparison searches; i.e. searches which determine whether the magnitude of each stored word is greater or less than the magnitude of a search word, sometimes referred to as a test number.

Briefly, the invention herein is based on the recognition that by sequentially comparing for identity the bits of the search word with corresponding bits of stored words in order of significance, mismatch signals can be interpreted to indicate whether the magnitude of the stored word is greater or less than the magnitude of the search word if the states of the search word bits involved in the generation of the mismatch signals are known.

In a first embodiment of the invention, each memory cell employs a pair of non-destructive readout magnetic elements. Each pair of elements includes one element which stores the true state of the represented bit and one element which stores the complementary state. As disclosed in the cited patent, a digital memory so arranged can be interrogated such that the bits of the search word can be simultaneously compared for identity with the corresponding bits of the stored words. By considering the bits in order of decreasing significance however, an initial mismatch signal derived with respect to each stored word can be interpreted to indicate whether that stored word has a magnitude which is greater or less than the magnitude of the search word. That is, if a mismatch signal is generated when the search word bit being considered is a "1", the corresponding stored word bit must necessarily be a "0" and consequently the stored word necessarily has a magnitude which is less than the search word. On the other hand, if an initial mismatch signal is generated when a search word bit "0" is being considered, then the magnitude of the stored word must necessarily be greater than the magnitude of the search word. It should be apparent that for purposes of magnitude comparison, the only meaningful mismatch signal is the one generated with respect to the most significant bits in the search and stored words which differ. Thus, where the bits are considered in order of decreasing significance, only the initially generated mismatch signal is meaningful. Coupled to each of the word sense lines is a greater than match flip-flop and a less than match flip-flop. The initially generated mismatch signal on each word sense line sets the appropriate match flip-flop and once either one of the match flip-flops is set, the other match flip-flop associated with that same word is prevented from being set in response to subsequent mismatch signals.

In a second embodiment of the invention in lieu of providing two memory elements in each memory cell, a memory is provided which requires only one memory element per stored bit of information but which requires one additional element per each stored word. Upon interrogation of any column of memory elements, each element in a first state will provide an output pulse of a first polarity on its associated word sense line. If the search bit of corresponding significance also defines a first state, a pulse of opposite polarity is applied to each of the word sense lines. Consequently, where the stored bit and search bit are identical, no resultant pulse appears on the word sense line. Where the stored bit is not identical to the search bit, as where the stored bit is a "1" and the search bit is a "0", the resulting signal on the word sense line comprises the first polarity pulse. On the other hand, when the stored bit is a "1" and the search bit is a "0", the resulting signal on the word sense line comprises the opposite polarity pulse. If a greater than match flip-flop sensitive to the first polarity pulse, and a less than match flip-flop sensitive to the opposite polarity pulse are connected to each word sense line, and are interconnected so that when one match flip-flop is set, the other will be prevented from being set, the states of the match flip-flops after all of the bits have been considered indicate which of the stored words has a greater magnitude and which of the stored words has a lesser magnitude than the search word. If neither match flip-flop is set at the completion of the test, the associated stored word is exactly equal to the search word.

The third embodiment of the invention is structurally similar to the second embodiment but whereas bits are considered in order of decreasing significance in the second embodiment, they are considered in order of increasing significance in the third embodiment. A different word sense line couples all of the memory elements of each of the memory locations to a different match flip-flop. The match flip-flop coupled to each of the word sense lines will switch between states as mismatch signals are developed. However, its final state will be determined by the last mismatch signal developed in each word and consequently its state at the termination of a search is indicative of whether the magnitude of the corresponding stored word is greater or less than the magnitude of the search word.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1(*b*) illustrates the element of FIG. 1(*a*) now defining a second state;

FIGURE 3(*a*) is a schematic illustration of a second embodiment of the invention;

FIGURE 3(*b*) comprises a table illustrating the signals generated on each word sense line in response to each of four possible comparison situations; and FIGURE 4 is a schematic illustration of a third embodiment of the invention.

Figure 1A:
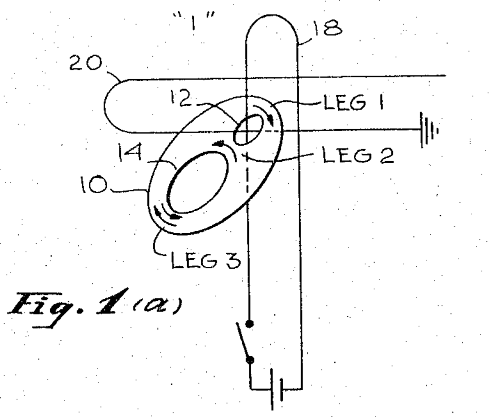
FIGURE 1(*a*) is a schematic illustration of a typical non-destructive readout magnetic memory element, defining a first state, which is suitable for use in the present invention.
Figure 1B:
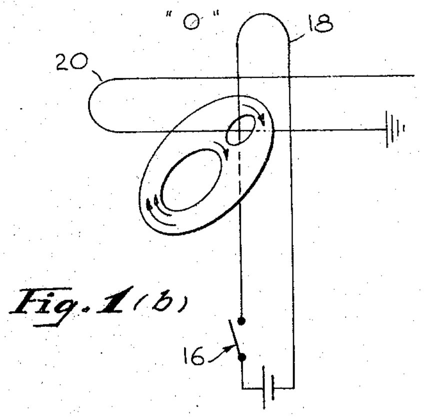
Figure 2:
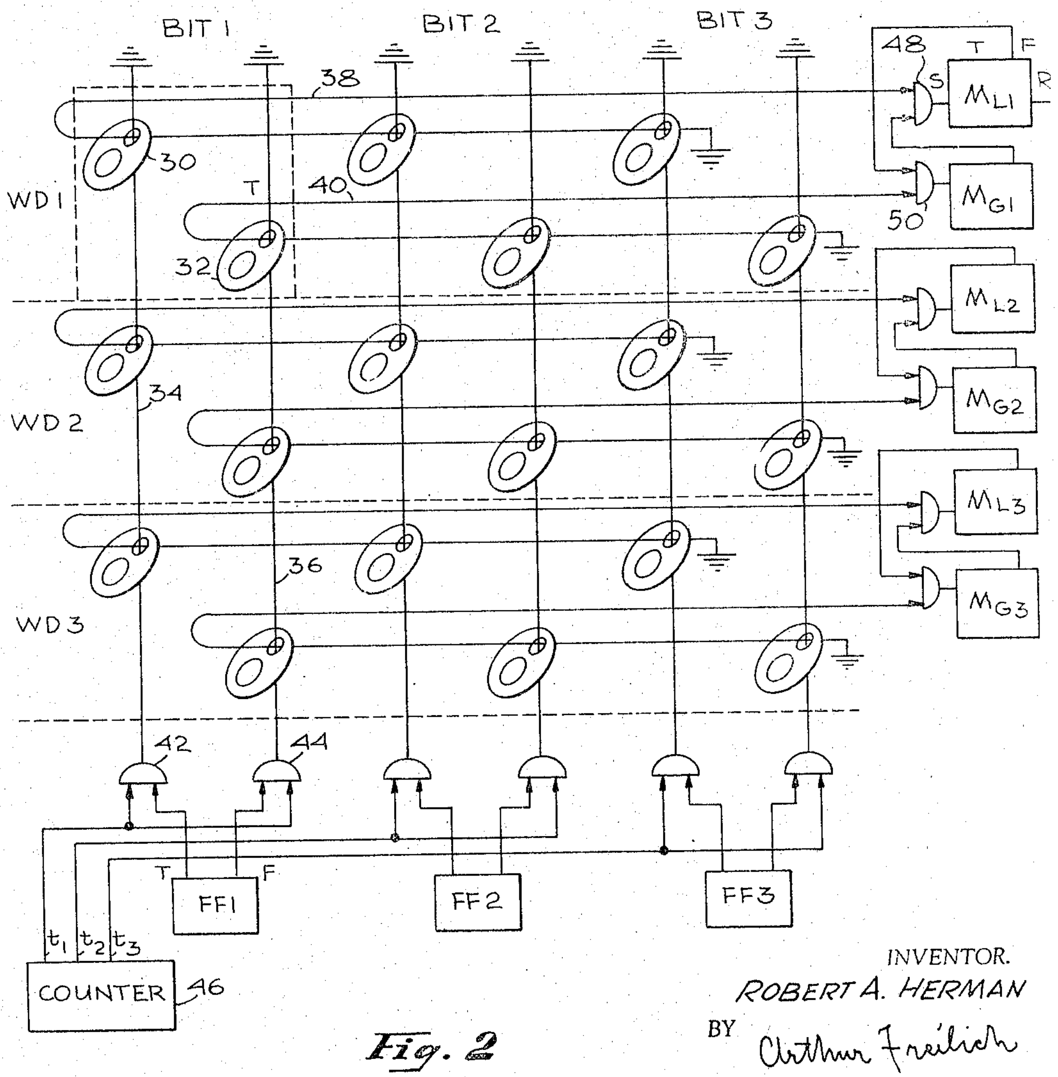
FIGURE 2 is a schematic illustration of a first embodiment of the present invention.

Prior to proceeding with an explanation of the various embodiments of the invention, attention is directed to FIG. 1 which illustrates a typical non-destructive readout memory element which can be suitably used in the three embodiments of the invention illustrated in FIGS. 2, 3, and 4. The element of FIG. 1 is commonly called a Transfluxor and comprises a core of magnetic material 10 which defines a small aperture 12 and a large aperture 14 therein. The legs of material on either side of the aperture 12 are respectively identified as legs 1 and 2 and the magnetic material on either side of aperture 14 are identified as legs 2 and 3. The core of FIG. 1 is constructed so that the cross-sectional area of leg 3 is equal to or greater than the sum of the cross-sectional area of legs 1 and 2. Consequently, the total flux in leg 3 is equal to or greater than the total flux in legs 1 and 2.

The core 10 can be driven (by means not shown) to a blocked state, as shown in FIG. 1(*b*), in which the flux around the entire core is oriented in the same direction. The flux orientation in FIG. 1(*b*) is clockwise. Alternatively, the core can be driven to an unblocked state as shown in FIG. 1(*a*) in which the flux around the small aperture 12 is oriented in a clockwise direction. When a positive pulse is developed in the winding 18, as by closing switch 16, it tends to orient the flux around the small aperture 12 in a counterclockwise direction. If the core is in a blocked state, inasmuch as the flux in leg 2 is already saturated in a counterclockwise direction with respect to the aperture 12, no magnetic switching will occur. On the other hand, when the core is in an unblocked state, as in FIG. 1(*a*), the flux around the small aperture will switch from the clockwise orientation illustrated to a counterclockwise orientation. Thus, no output pulse will appear on sense line 20 as a result of applying a positive pulse to winding 18 threaded through the blocked core of FIG. 1(*b*) but a positive pulse will appear on sense winding 20 threaded through the unblocked core of FIG. 1(*a*). Note that after core 10 of FIG. 1(*a*) switches, it still defines an unblocked state, albeit a different unblocked state in which the flux around the small aperture 12 will be oriented in a counterclockwise instead of a clockwise direction. It can be restored to the state of FIG. 1(*a*) by several different techniques; for example, a negative pulse driven through winding 18 will switch the core from the second unblocked state back to the unblocked state of FIG. 1(*a*) without effecting cores in a blocked state which might be threaded on the same winding 18. If the unblocked state of FIG. 1(*a*) is used to represent a binary "1" and the blocked state of FIG. 1(*b*) to represent a binary "0", it should be apparent that the information stored in any core can be read non-destructively. That is, the information need not be destroyed in order to read, although with the Transfluxor element, it is essential that the information be restored after reading but restoration can be accomplished by indiscriminately utilizing a restoration signal whose characteristics are completely independent of the information stored in the cores.

The Transfluxor element of FIG. 1 will, for exemplary purposes be employed in the embodiments of the invention to be hereinafter described but it should be understood that other non-destructive readout elements could also be suitably employed. It will henceforth be assumed that a current provided on an interrogate line 18 will cause a positive pulse to appear on the sense line 20 whenever the core threaded by the lines 18 and 20 defines a "1" state. Alternatively, whenever the core defines a "0" state, then a current on the interrogate line 18 will fail to produce a corresponding pulse on the sense line 20. As will be better understood hereinafter, the pulses appearing on the word sense lines are developed as mismatch signals to indicate that the state of the core is different from the state of the corresponding search register element.

Attention is now called to FIG. 2 which illustrates a first embodiment of the present invention which permits the magnitude of a test number to be simultaneously compared with the magnitude of each of a plurality of numbers stored in a memory matrix by sequentially comparing corresponding digits of the number. The typical memory matrix illustrated consists of three memory locations, each capable of storing a single multibit number and including three memory cells, each cell capable of storing a single bit.

Each memory cell in the embodiment of FIG. 1 includes a pair of magnetic cores 30 and 32 of the type illustrated in FIG. 1. The cores 30 and 32 in each memory cell are respectively employed to define the complementary and true states of the bits stored in the memory cell. Thus, if a binary "1" is to be stored in the first or most significant bit position of word one, then core 30 would be driven to the blocked state shown in FIG. 1(*b*) to represent a binary "0" and the core 32 would be driven to the unblocked state of FIG. 1(*a*) to represent a binary "1".

The memory cells are arranged in a matrix of N rows and Q columns and in the illustrated embodiment both N and Q have been assumed to be three. In each column of memory cells, a first digit interrogate line portion 34 is threaded through the small aperture of all of the cores 30 and a second digit interrogate line portion 36 is threaded through all of the small apertures of cores 32.

Whereas digit interrogate lines are used to couple matrix memory cells of corresponding significance from different memory locations, word sense lines are utilized to couple memory cells which comprise part of the same memory location. Thus, a first word sense line portion 38 is threaded through the small apertures of core 30 and a second word sense line portion 40 is threaded through the small apertures of cores 32.

The upper ends of digit interrogate line portions 34 and 36 are grounded and their lower ends are respectively coupled to the outputs of AND gates 42 and 44. The true output terminal of the flip-flop FF1 comprising the first stage of a search register provided to store a test number, is connected to the input of AND gate 42. Similarly, the false output terminal of flip-flop FF1 is connected to the input of AND gate 44. The true and false output terminals of flip-flops FF2 and FF3 are similarly connected to the inputs of the AND gates 42 and 44 whose outputs are connected to the digit interrogate line portions associated with the memory cells of bit positions 2 and 3.

A counter 46 having output terminals $T_1$, $T_2$, and $T_3$ is provided. The counter 46 functions to sequentially energize each of its output terminals to respectively define time marks $t_1$, $t_2$, and $t_3$. The output terminal $T_1$ is connected to the input of AND gates 42 and 44 associated with memory cells of bit position 1. Similarly, output terminals $T_2$ and $T_3$ are connected to the inputs of gates 42 and 44 associated with the memory cells of bit positions 2 and 3.

The first terminals of the word sense line portions 38 and 40 are each grounded. The second terminals of the portions 38 and 40 are each respectively connected to the input of a different AND gate 48 and 50. The output of AND gate 48 is connected to the set input terminal of a less than match flip-flop $M_{L1}$ and the output of AND gate 50 is connected to the set input terminal of a greater than match flip-flop $M_{G1}$. The false output terminal of the flip-flop $M_{L1}$ is connected to the input of AND gate 50 and the false output terminal of flip-flop $M_{G1}$ is connected to the input of gate 48. A positive pulse appearing on word sense line portion 38 functions to set flip-flop $M_{L1}$ if flip-flop $M_{G1}$ is false. Alternatively, a positive pulse on word sense line portion 40 functions to set flip-flop $M_{G1}$ if flip-flop $M_{L1}$ is false.

In order to appreciate the operation of the content addressable memory embodiment of FIG. 2, attention is called to Table I.

TABLE I

| | Stored Numbers | $M_G$ | | | | $M_L$ | | | |
|---|---|---|---|---|---|---|---|---|---|
| | | $t_0$ | $t_1$ | $t_2$ | $t_3$ | $t_0$ | $t_1$ | $t_2$ | $t_3$ |
| (0) | 000 | F | F | F | F | F | T | T | T |
| (1) | 001 | F | F | F | F | F | T | T | T |
| (2) | 010 | F | F | F | F | F | T | T | T |
| (3) | 011 | F | F | F | F | F | T | T | T |
| (4) | 100 | F | F | F | F | F | F | F | T |
| (5) | 101 | F | F | F | F | F | F | F | F |
| (6) | 110 | F | F | T | T | F | F | F | F |
| (7) | 111 | F | F | T | T | F | F | F | F |
| | [101] | | | | | | | | |

Note that Table I illustrates both the eight possible three bit numbers which can be stored in the memory matrix of FIGURE 2 and a typical test number, arbitrarily assumed to be "101" which is stored in the search register comprised of flip-flops FF1, FF2, and FF3. At time $t_0$ all the greater than and less than match flip-flops are driven to a false state (by means not shown). At time $t_1$, the output terminal $T_1$ of counter 46 will be energized to thereby cause a current pulse to be applied to digit interrogate line portion 34 threaded through the memory cells of bit position 1. In all memory cells storing a bit "1", the cores 34 will all be in a blocked state and consequently no output pulses will be developed on word sense line portions 38. However, if any of the memory cells of bit position 1 is storing a "0", then the core 30 thereof will be in an unblocked state and a positive output pulse will be developed on the word sense line portion 38 coupled thereto. A positive output pulse developed on word sense line portion 38 will set the less than match flip-flop coupled thereto. As a consequence of a match flip-flop being set, it should readily be appreciated that the opposite match flip-flop associated with the same word will thereafter be prevented from being set. Note that if any of the memory locations of FIG. 2 store any of the first four numbers in Table I, then at time $t_1$, the less than flip-flop $M_L$ associated with those locations will be set and will thereafter remain set indicating that the associated stored number has a magnitude less than the magnitude of the test word stored in the search register.

At time $t_2$, note that a current is applied to digit interrogate line portion 36 coupled to the memory cells of bit position 2. As a result, in all those locations in memory storing either of numbers 2, 3, 6 or 7, a positive output pulse will be applied to word sense line portion 40 which will function to set the greater than flip-flop $M_G$ coupled thereto unless the less than match flip-flop associated therewith has previously been set. Note in Table I that with respect to numbers 2 and 3, the less than match flip-flop was set at time $t_1$. Consequently, during time $t_2$ only the match flip-flop $M_G$ of locations storing numbers 6 or 7 will be set. Similarly, note that at time $t_3$ the less than match flip-flop $M_L$ associated with a location storing the number 4 will be set.

Accordingly, it should be appreciated that by examining the states of the match flip-flop $M_L$ and $M_G$ after time $t_3$, the stored numbers whose magnitude is either greater than or less than the magnitude of the test number can be ascertained. For example, if match flip-flop $M_{G1}$ is true, then the number stored in word location one has a magnitude greater than the test number. On the other hand, if the match flip-flop $M_{L2}$ is true, then the number stored in location two has a magnitude less than that of the test number. If neither match flip-flop $M_G$ or match flip-flop $M_L$ associated with a particular word is true, then it is apparent that the number stored in the corresponding memory location is neither greater nor less than the test number but rather is equal to the test number.

Attention is now called to a second embodiment of the invention illustrated in FIG. 3(*a*). Whereas the embodiment of FIG. 2 required that each memory cell include a pair of magnetic cores for defining the true and complementary states of the bit stored by the cell, the embodiment of FIG. 3 illustrates a memory which requires the provision of only one core per stored bit of information plus one extra core for each memory location. In FIG. 3(*a*), the true output terminals of the search register flip-flops are each connected to the input of a different AND gate 50. The output terminals $T_1$, $T_2$, and $T_3$ of counter 46 are each respectively connected to the inputs of a different one of AND gates 50. The outputs of AND gates 50 are all connected to the input of OR gate 52.

Output terminal $T_1$ of counter 46 is connected directly to a digit interrogate line 53 which is threaded through the small aperture of all of the cores of bit position 1. Similarly, output terminals $T_2$ and $T_3$ of counter 46 are respectively connected to the digit interrogate lines threaded through the cores of bit positions 2 and 3. The output of OR gate 52 is connected to an interrogate line threaded through the cores of a word bit column which includes one core for each memory location.

A different word sense line is threaded through, in the same sense, the small aperture of all of the cores of each different word, and in an opposite sense through the small aperture of a different one of the word bit column cores. For example, note that word sense line 54 is threaded through the small aperture of all of the cores in word location 1 in the same sense and through the small aperture of a core in the word bit column in an opposite sense. A first terminal of each word sense line is grounded and a second terminal thereof is connected directly to the input of AND gate 56 and through an inverter 58 to the input of AND gate 60. The output of AND gate 56 is connected to the set input terminal of a less than match flip-flop $M_L$ and the output of gate 60 is connected to the set input terminal of a greater than match flip-flop $M_G$. The false output terminal of flip-flop $M_G$ is connected to the input of AND gate 56 and the false output terminal of flip-flop $M_L$ is connected to the input of gate 60.

In order to understand the operation of the embodiment of FIG. 3(*a*), consider the table illustrated in FIG. 3(*b*). It should be apparent that any test number bit and any stored bit can define either a "0" or a "1" state. Consequently, four possible situations are encountered in comparing a test number bit with a stored bit. These four possibilities are indicated in lines (1)–(4) of the table shown in FIG. 3(*b*). Note in FIG. 3(*a*) that regardless of the state of the test number bit, currents are developed in sequence in each of the digit interrogate lines as a consequence of these lines being connected directly to the output terminals of counter 46. Thus, wherever a bit "1" is stored in the matrix, a positive output pulse will be developed on the word sense line coupled thereto. It should further be apparent from FIG. 3(*a*) that concurrent with the application of a current to a digit interrogate line, a current will be applied to the interrogate line threaded through the cores of the word bit column if the corresponding test number bit is a "1." Inasmuch as the word sense lines are threaded through the cores of the word bit column in an opposite sense to the sense of threading through the matrix cores, whenever a current is provided on the interrogate line of the word bit column, a negative pulse will be provided on each of the word sense lines. The resultant signals appearing at the inputs to gates 56 and 60 connected to each word sense line for each of the four possible comparison situations are as shown in the table of FIG. 3(*b*). That is, where the test number bit is a "0" and the stored bit is a "1" it can be seen that no current is applied to the word bit column interrogate line and consequently a positive polarity signal will appear at the inputs to gates 56 and 60. As shown in line 3, where the test number bit is a "1" and the stored bit is a "0" then a negative polarity signal will appear at the inputs to gates 56 and 60. With respect to the situation described in line 1 of the table of FIG. 3(*b*), it is apparent that no signal is applied to the word sense line and with respect to the situation in line 4, it is apparent that the positive and negative polarity signals applied to the word sense line cancel each other.

The positive signal appearing on the word sense line enables gate 56 which in turn sets the match flip-flop $M_L$ in the event that the associated flip-flop $M_G$ has not been previously set. On the other hand, the negative signal appearing on the word sense line resulting from the situation encountered in line 3 of FIG. 3(*b*), sets the flip-flop $M_G$ in the event that the flip-flop $M_L$ has not been previously set. Previously set forth Table I which was introduced to explain the operation of the embodiment of FIG. 2 applies equally as well to the embodiment of FIG. 3(*a*).

Attention is now called to the embodiment of FIG. 4 which, like the embodiment of FIG. 3(*a*) requires the provision of only one core per stored bit of information plus a word bit column consisting of one extra core for each memory word location. Unlike the embodiment of FIG. 3(*a*), the apparatus of FIG. 4 examines the bits of the test number in order of increasing rather than decreasing significance and as a consequence of this does not require the provision of logic means for assuring that the match flip-flops respond only to the development of the initial mismatch signal on each of the word sense lines. The structure of FIG. 4 is substantially identical to that of FIG. 3(*a*) except however that the output terminals $T_1$, $T_2$, and $T_3$ of counter 46 are connected respectively to the digit interrogate lines of the cores in bit positions 3, 2, and 1. Additionally, the output terminals $T_1$, $T_2$, and $T_3$ are respectively connected to the inputs of AND gate 60 connected to the true output terminals of flip-flops FF3, FF2, and FF1.

Each of the word sense lines 62 is connected directly to the set input terminal of a different match flip-flop and through an inverter 64 to the reset input terminal of the flip-flop. In the operation of the embodiment of FIG. 4, the match flip-flops toggle back and forth as each mismatch signal is developed on the word sense line connected thereto. The embodiment of FIG. 4 is particularly useful where it is not desired to know which stored numbers are equal to a test number but only those which are either greater than or less than a test number. If it is desired to know which numbers are greater than a test number, the match flip-flops are all initially driven to a false state. The test number bits are then considered in order of increasing significance.

TABLE II

| | | M | | | |
|---|---|---|---|---|---|
| | | $t_0$ | $t_1$ | $t_2$ | $t_3$ |
| (0) | 000 | F | F | F | F |
| (1) | 001 | F | F | F | F |
| (2) | 010 | F | F | T | F |
| (3) | 011 | F | F | T | F |
| (4) | 100 | F | F | F | F |
| (5) | 101 | F | F | F | F |
| (6) | 110 | F | F | T | T |
| (7) | 111 | F | F | T | T |
| | [101] | | | | |

Note in Table II that when the least significant test number bit is a "1" then of course no stored bit of corresponding significance can be greater and therefore during time $t_1$ none of the match flip-flops is set true. During time $t_2$ the immediately more significant test number bit is considered. And it will be noted that the match flip-flop associated with locations storing the numbers 2, 3, 6, and 7 is driven true. During time $t_3$ when the most significant test number bit which is a "1" is considered, negative mismatch signals are developed on the word sense lines of those locations storing numbers 2 and 3 and consequently the match flip-flops coupled thereto are reset to a false state. Thus, at the termination of a search, only the match flip-flops associated with the locations storing the numbers 6 and 7 remain true. It will be noted that the results obtained by considering the bits in order of increasing significance as illustrated in Table II correspond to the results obtained by considering the bits in order of decreasing significance as expressed by Table I.

From the foregoing, it should be appreciated that several content addressable memory embodiments have been disclosed herein which are capable of simultaneously comparing the magnitude of a test number with the magnitude of each of the numbers stored in memory. The capability is achieved by considering the bits of the test and stored numbers in order of significance, either increasing or decreasing, while considering the stored words in parallel or simultaneously. The three embodiments are all characterized by the provision of means for sequentially developing binary signals representative of the states of the test number bits. That is in the embodiment of FIG. 2, in order to respectively represent test number bits "0" and "1," currents are developed on lines 36 and 34. In FIGS. 3 and 4, test number bit "1's" are represented by the application of current to the word bit interrogate line and a bit "0" is represented by the absence of current thereon. Although each of the illustrated embodiment utilizes a Transfluxor type non-destructive readout magnetic memory element, it is reiterated that other non-destructive readout elements could equally as well be employed. It is further pointed out that although each of the memory matrices illustrated herein has consisted of three locations, each including three cells, it should be understood that the principles of each of the embodiments are applicable to any sized memory. Also, although rectangular memory matrices comprised of "rows" and "columns" have been referred to in conjunction with each of the disclosed embodiments, it should be appreciated that the actual physical orientation of the memory elements is of no importance and that these terms are used only to designate groups of elements which are similarly treated.

The embodiments of the invention in which an exclusive property or privilege is claimed are defined as follows:

1. Apparatus for comparing the magnitude of each of a plurality of multibit binary numbers, wherein each such number is stored in a different location in a digital memory, with the magnitude of a multibit binary test number, said apparatus comprising:

a source of successive clock signals;

means responsive to said successive clock signals for respectively generating binary signals each representing the state of a different test number bit, the bits defining said test number being represented in order of numerical significance;

means responsive to the generation of each of said binary signals for performing a simultaneous comparison between the state of a given bit in the test number represented by said binary signal and the states of all bits of corresponding significance stored in said memory;

means responsive to the performance of each of said simultaneous comparisons for providing a plurality of binary indicating signals wherein each such signal indicates whether or not the state of a different bit stored in said memory is the same as or different from the state of the test number bit of corresponding significance; and a plurality of sensing devices, each associated with a different location and responsive to a binary indicating signal provided as a consequence of a comparison of a bit thereof.

2. Apparatus for comparing the magnitude of each of a plurality of multibit binary numbers, wherein each such number is stored in a different location in a digital memory, with the magnitude of a multibit binary test number, said apparatus comprising:

a source of successive clock signals;

means responsive to said successive clock signals for respectively generating binary signals each representing the state of a different test number bit, the bits defining the test number being represented in order of numerical significance;

means responsive to the generation of each of said binary signals for performing a simultaneous comparison between the state of a given bit in the test number represented by said binary signal and the states of all bits of corresponding significance stored in said memory, said means for performing said simultaneous comparisons including a different word sense line associated with each of said bits of corresponding significance stored in said memory;

means responsive to the performance of each of said simultaneous comparisons for providing a mismatch signal on each of said word sense lines associated with a bit stored in memory whose state is different from the state of the test number bit of corresponding significance; and a different sensing device coupled to each of said word sense lines, each of said sensing devices including means responsive to a mismatch signal provided on the word sense line coupled thereto.

3. The apparatus of claim 2 wherein said digital memory comprises a matrix of memory cells respectively including N rows of memory cells, each row comprising a memory location capable of storing a multibit binary number, and Q columns of memory cells, each column including a corresponding memory cell from each location;

each of said memory cells including first and second memory elements respectively storing the true and complementary states of a bit;

said word sense line associated with said cell including first and second portions respectively coupled to said first and second memory elements;

a plurality of digit interrogate lines each of which is coupled to all cells of corresponding significance, said digit interrogate line including first and second portions respectively coupled to said first and second memory elements;

said means for generating a binary signal including means for applying a current to said digit interrogate line first portion to represent a "1" state of a test number bit and a current to said digit interrogate line second portion to represent a "0" state of a test number bit.

4. The apparatus of claim 2 wherein said digital memory comprises a matrix of memory elements respectively including N rows of memory elements, each row comprising a memory location capable of storing a multibit binary number, and Q columns of memory elements, each column including a corresponding memory element from each location;

a word bit column of N elements;

a plurality of digit interrogate lines each of which is coupled to all elements of corresponding significance;

a word bit interrogate line coupled to all of said word bit elements;

each of said word sense lines coupled in the same sense to all of the elements in a different row and in an opposite sense to a different one of said word bit elements;

said means for generating a binary signal including means for only applying current to said word bit interrogate line simultaneously with the application of current to a digit interrogate line associated with a test bit having a "1" state.

5. A content addressable memory comprising:

a matrix of binary memory elements respectively including N rows of elements, each row comprising a memory location capable of storing a multibit number, and Q columns of elements, each column including a corresponding memory element from each location, each element capable of storing a bit;

a word bit column including N memory elements;

a search register including Q storage elements capable of storing a multibit test number;

a plurality of digit interrogate lines each of which is associated with all of the elements of a different one of said matrix columns and a corresponding storage element of said search register;

a word bit interrogate line coupled to each of said N elements in said word bit column;

a plurality of word sense lines each of which is associated in the same sense with all of the elements of a different one of said rows and in an opposite sense with a different one of the elements in said word bit column;

each of said memory elements being responsive to a current on the interrogate line associated therewith for providing an output pulse on a word sense line associated therewith only when said memory element defines a first state;

means for sequentially applying a current to each of said digit interrogate lines;

means for applying a current to said word bit interrogate line concurrently with the application of a current to each digit interrogate line associated with a search register storage element defining a first state; and sensing means connected to each of said word sense lines and responsive to pulses appearing thereon.

6. The combination of claim 5 wherein said current applied to each of said digit interrogate lines is applied sequentially in order of decreasing significance and wherein said sense means connected to each of said word sense lines comprises first and second bistable devices respectively responsive to first and second opposite polarity pulses on the word sense line coupled thereto for switching to a true state; and means for inhibiting the switching of either of said bistable devices to said true state whenever the other one of said bistable devices defines a true state.

7. The combination of claim 6 wherein each of said memory elements comprises a multiaperture non-destructive readout magnetic element.

8. The combination of claim 5 wherein said current applied to each of said digit interrogate lines is applied sequentially in order of increasing significance and wherein said sense means connected to each of said word sense lines comprises a bistable device responsive to first and second opposite polarity pulses on the word sense line connected thereto for respectively assuming true and false states.

9. The combination of claim 8 wherein each of said memory elements comprises a multiaperture non-destructive readout magnetic element.

10. A content addressable memory comprising:

a matrix of binary memory elements respectively including N rows of elements, each row comprising a memory location capable of storing a multibit number, and Q columns of elements, each column including a corresponding memory element from each location, each element capable of storing a bit;

a word bit column including N memory elements;

a search register including Q storage elements capable of storing a multibit test number;

a plurality of digit interrogate lines each of which is associated with all of the elements of a different one of said matrix columns and a corresponding storage element of said search register;

a word bit interrogate line coupled to each of said N elements in said word bit column;

a plurality of word sense lines each of which is associated with all of the elements of a different one of said rows and with a different one of the elements in said word bit column;

each of said matrix memory elements defining a first state being responsive to a current on the digit interrogate line associated therewith for providing a positive output pulse on the word sense line associated therewith;

each of said word bit column memory elements defining a first state being responsive to a current on the interrogate line associated therewith for providing a negative output pulse on the word sense line associated therewith;

means for sequentially applying a current to each of said digit interrogate lines;

means for applying a current to said word bit interrogate line concurrently with the application of a current to each digit interrogate line associated with a search register storage element defining a first state; and sensing means connected to each of said word sense lines and responsive to pulses appearing thereon.

11. The apparatus of claim 1 wherein each of said sensing devices is capable of defining at least first and second states; and means causing each of said sensing devices to ultimately define a state dependent on the state of the most significant test number bit different from the bit of corresponding significance associated with that sensing device.

12. The apparatus of claim 2 wherein each of said sensing devices is capable of defining at least first and second states; and means coupling said word sense lines to said sensing devices causing each of said sensing devices to ultimately define a state dependent on the state of the most significant test number bit involved in a comparison providing a mismatch signal on the word sense line coupled to that sensing device.

13. The apparatus of claim 2 wherein each of said sensing devices is responsive only to the initial mismatch signal provided on the word sense line coupled thereto.

References Cited by the Examiner

UNITED STATES PATENTS 3,031,650 4/1962 Koerner ---------- 340—174

ROBERT C. BAILEY, *Primary Examiner.*

MALCOLM A. MORRISON, R. B. ZACHE, *Assistant Examiners.*